United States Patent Office 3,464,958
Patented Sept. 2, 1969

3,464,958
PRODUCTION OF POLYETHER ESTER COPOLYMERS OF TETRAHYDROFURAN AND CYCLIC ACID ANHYDRIDE
Kazuo Matsuura and Teiji Tsuruta, Kyoto-shi, Japan, assignors to Nippon Oil Co., Ltd., Tokyo, Japan
No Drawing. Continuation-in-part of application Ser. No. 407,872, Oct. 30, 1964. This application July 17, 1967, Ser. No. 653,623
Claims priority, application Japan, Nov. 2, 1963, 38/59,035
Int. Cl. C08g 17/003
U.S. Cl. 260—78.4         11 Claims

ABSTRACT OF THE DISCLOSURE

A process for producing a copolymer of tetrahydrofuran and a cyclic acid hydride selected from the group consisting of maleic anhydride, citraconic anhydride, succinic anhydride, phthalic anhydride, dihydrophthalic anhydride, tetrahydrophthalic anhydride, hexahydrophthalic anhydride and endomethylene tetrahydrophthalic anhydride by means of a ternary catalyst system, of which the first component is an organometallic compound of lithium, zinc or aluminum, the second component is water and the third component is selected from the group consisting of propylene oxide, epichlorohydrin, acetyl chloride, $\beta$-propiolactone and $\alpha$-chlorodimethyl ether.

This application is a continuation-in-part of application Ser. No. 407,872, filed Oct. 30, 1964, now abandoned.

Present invention relates to a process for the production of a novel copolymer of tetrahydrofuran and a cyclic acid anhydride having different physical properties from those of tetrahydrofuran homopolymers. Particularly this invention relates to a process for producing a novel polyether ester by copolymerizing tetrahydrofuran and a cyclic acid anhydride using a catalyst system containing an organometallic compound of a metal selected from the group consisting of lithium, zinc and aluminum.

Various efficient catalyst systems have been known for effecting homopolymerization of tetrahydrofuran. However, homopolymers obtained by using such conventional catalyst systems are solids which are soluble in almost all organic solvents such as methanol, acetone, at room temperature or at elevated temperatures and have low melting points (40° C. to 60° C.).

We have made studies on the copolymerization of tetrahydrofuran and a cyclic acid anhydride using a catalyst system containing an organometallic compound of a metal selected from the group consisting of lithium, zinc and aluminum and have succeeded to produce a novel copolymer which has completely different physical properties than those of polytetrahydrofuran. As will be explained more fully with reference to examples, copolymers obtained by the process of present invention are white solids which are insoluble in methanol, acetone, hexane and like even at elevated temperatures. Some of copolymers obtained by the process of present invention have high softening points as high as 200° C. Films having very high strength and elasticity can be formed from copolymers produced by the process of present invention. Thus, it is clear that the copolymers obtained by the process of present invention have novel and completely different properties from those of known tetrahydrofuran homopolymers.

The study of the copolymerization of tetrahydrofuran and an acid anhydride has been made by Austin et al. (U.S.P. 2,811,512) as well as by Devoe et al. (British Patent 938,773).

The study made by Devoe et al. is particularly directed to the improvement of a polyester resin prepared from a dicarboxylic acid anhydride and a monoepoxide, and more particularly it is directed to a process for the synthesis of a thermoplastic material having polyester branch chains bonded to a polyhydric alcohol such as glycerol as a nucleus-forming initiator. The thermoplastic material can be used in the production of fibers, and potting, casting, moulding and laminating compositions. As a result of their study, Devoe et al. have succeeded in the synthesis of a nongelated thermoplastic resin having many polyester branch chains which had been difficult to synthesize, the success of the synthesis being considered to be worthy of technical admiration. This synthesizing process is characterized by copolymerizing a dicarboxylic acid anhydride and a monoepoxide in the presence of, as a nucleus-forming initiator, a polyfunctional compound containing active hydrogen compounds such as glycerol, pentaerythritol and the like which are capable of reacting with the epoxoide and anhydride.

And the study made by Austin et al. is directed to a process for the synthesis of a polyester by copolymerizing tetrahydrofuran (THF) and a carboxylic acid anhydride at a temperature of more than 150° C. in the presence of, as a catalyst, a compound such as $BF_3.OC_4H_{10}$, boric oxide, $SnCl_4$, $H_2SO_4$, $FeCl_3$, $ZnCl_2$ or the like. From a consideration that many of the polyesters produced are in viscous liquid form as shown in the examples, this process invented by Austin and his colleagues appears to be intended to thereby synthesize a polyester for plasticizer.

On the other hand, as previously mentioned, the object of the present invention is to synthesize a polyether ester having a high degree of polymerization and a high softening point by copolymerizing tetrahydrofuran and a cyclic acid anhydride in the presence of a catalytic system containing an organometallic compound as a component thereof.

It is thus clear that the present invention is quite different from those of Devoe and Austin in technical objects, reaction conditions, properties of products and the like.

Cyclic acid anhydrides which may be used in the process of present invention are anhydrides of various aliphatic, aromatic and alicyclic acids and are represented by the following general Formulas I, II, III and IV.

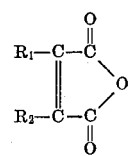

(I)

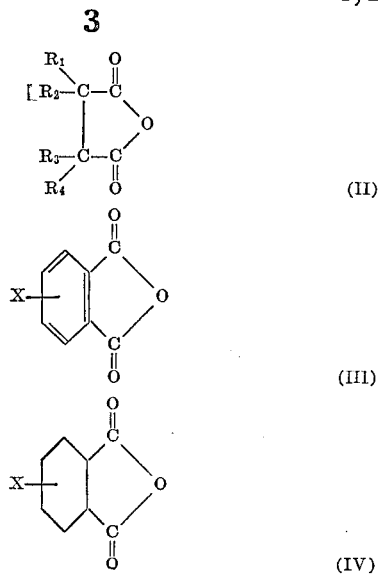

In the above formulas, $R_1$, $R_2$, $R_3$ and $R_4$ are radicals selected from the group consisting of hydrogen and alkyl radicals and X is a radical selected from the group consisting of hydrogen, alkyl, and endomethylene radicals. Most useful examples of cyclic acid anhydrides according to the process of present invention are succinic anhydride, maleic anhydride, citraconic anhydride, phthalic anhydride, tetrahydrophthalic anhydride, hexahydrophthalic anhydride and endomethylenetetrahydrophthalic anhydride.

The structure and physical properties of polymers obtained by the process of present invention vary depending on the molar ratio of cyclic acid anhydride:tetrahydrofuran used. The molar ratio preferably used in the present invention is in the range of from 0.01 to 0.30.

The catalyst systems used in the present invention are ternary components systems containing an organometallic compound. The first component of said ternary components system is an organometallic compound, the second component is water and the third component is a member selected from propylene oxide, epichlorohydrin, acetylchloride, β - propiolactone and α - chlorodimethyl ether.

The organometallic compounds which may be used as the first component of the catalyst in the process of present invention may be represented by the general formula $R_nM$, wherein M is a metal selected from the group consisting of lithium, zinc and aluminum, $n$ is an integer from 1 to 3, inclusive, and R is alkyl or aryl radicals, some but not all of the R may also be a radical selected from the group consisting of hydrogen, halogen, hydroxy and alkoxy radicals. Examples of such organometallic compounds are n-butyl lithium, dimethyl zinc, diethyl zinc, trimethyl aluminum, triethyl aluminum, tri-isobutyl aluminum, tri-phenyl aluminum and the like.

The second component is water and the third is a compound selected from β-propiolactone, α-chlorodimethyl ether, acetyl chloride, propylene oxide and epichlorohydrin. Preferably the molar ratio between these three components in the catalyst system is from 1:0.5:0.5 to 1:3:3 of 1st component:2nd component:3rd component.

Ordinarily, the catalyst system is used in a proportion of about 0.1 to 10 mol percent (calculated as metal concentration) based on the total amount of the monomers while more or less amount of catalyst system may be used.

The polymerization reaction of present invention may be conducted in the absence or in the presence of a solvent. When solvent is used, preferred solvent is one in which the cyclic acid anhydride has high solubility. Inert solvent such as dioxane, toluene and benzene may be used as the polymerization medium in the process of present invention.

This process can be carried out at any suitable polymerization temperature. However, the polymerization is ordinarily carried out at a temperature ranging from −78° C. to 200° C.

The reaction pressure is also not limited and this process can be carried out easily at atmospheric pressure.

For better understanding of present invention examples will be set forth below. It will be understood, however, that present invention is not limited to those described in the examples.

Example I 3.89 grams of endomethylenetetrahydrophthalic anhydride were placed in a test tube having an internal capacity of 50 ml. After replacing air in the test tube with nitrogen, the cyclic acid anhydride was dissolved by adding 16.00 grams of tetrahydrofuran. 0.011 gram of water and 0.084 gram of propylene oxide were then added and the mixture was thoroughly mixed. Then 0.084 gram of triethylaluminum was added and the test tube was sealed. The sealed test tube was placed in a bath maintained at 30° C. and the polymerization was carried out for 7 days therein. After 7 days the reaction mixture was poured into methanol and polymer produced was recovered. Polymer thus obtained was purified by reprecipitation from tetrahydrofuran-methanol. Yield 15%.

The polymer was dissolved in dichloroethane and film was made from the solution. The film had extremely high strength and elasticity. Melting point determination was made with the film. No change was observed up to 150° C. Some shrinking was observed at about 170° C. and decomposition at about 200° C.

Since homopolymers of tetrahydrofuran have much lower softening points ranging from 40° C. to 50° C. and the homopolymers cannot be precipitated from methanol, it is clear that the polymers obtained is a copolymer of tetrahydrofuran and endomethylenetetrahydrophthalic anhydride. The fact was also confirmed from the infrared spectrum diagram of the polymer.

Example II 4.10 grams of endomethylenetetrahydrophthalic anhydride were placed in a test tube having an internal capacity of 50 ml. After replacing air in the test tube with nitrogen, the anhydride was dissolved by adding 8.44 grams of tetrahydrofuran and 8.66 grams of toluene. 0.025 gram of water, 0.082 gram of propylene oxide and 0.162 gram of triethylaluminum were then added and the test tube was sealed. Polymerization was conducted by placing the sealed tube in a bath maintained at 30° C. for 3 days. At the end of the 3 days the reaction mixture was poured into methanol and polymer produced was recovered. Crude product thus obtained was purified by treating in the same manner as described in Example I. Yield of polymer 87%. The polymer had a reduced viscosity of $\eta_{sp./c.}=0.73$ (c.=0.5 g./dl. in benzene at 30° C.).

Example III 1.48 grams of phthalic anhydride were placed in a test tube having an internal capacity of 50 ml. After replacing air in the test tube with nitrogen, the anhydride was dissolved by adding 8.44 grams of tetrahydrofuran. 0.09 gram of water, 0.47 gram of epichlorohydrin, and 0.58 gram of triethylaluminum were then added and the test tube was sealed.

Polymerization was conducted by placing the sealed tube in a bath maintained at 30° C. for 5 days. At the end of the 5 days the reaction mixture was poured into methanol and polymer produced was recovered. Crude product thus obtained was purified by treating in the same manner as described in Example I. Yield of polymer 73%. The polymer had a reduced viscosity of $\eta_{sp./c.}=0.45$ (c.=0.5 g./dl. in dichloroethane at 30° C.). The decomposition point of the polymer was around 120° C.

Example IV 3.89 grams of endomethylenetetrahydrophthalic anhydride were dissolved in 12.66 grams of tetrahydrofuran and 6.33 grams of toluene under nitrogen atmosphere. 0.036 gram of water, 0.184 gram of epichlorohydrin and 0.227 gram of triethylaluminum were then added. Polymerization was conducted at 30° C. for 3 days. Polymer was obtained in a yield of 65%. The polymer had a reduced viscosity of $\eta_{sp./c.}$=0.82 (c.=0.5 g./dl. in benzene at 30°. C.)

Example V 3.89 grams of endomethylenetetrahydrophthalic anhydride were dissolved in 8.44 grams of tetrahydrofuran and 4.22 grams of n-hexane under nitrogen atmosphere. 0.161 gram of triethylaluminum, 0.025 gram of water, and 0.111 gram of acetyl chloride were then added. Polymerization was conducted at 30° C. for 5 days. Polymer was obtained in a yield of 37%. The polymer had a reduced viscosity of $\eta_{sp./c.}$=0.18 (c.=0.5 g./dl. in benzene at 30° C.).

Example VI 1.52 grams of $\Delta^4$-tetrahydrophalic anhydride were dissolved in 8.44 grams of tetrahydrofuran under nitrogen atmosphere. 0.05 gram of water, 0.29 gram of β-propiolactone and 0.29 gram of triethylaluminum were then added. Polymerization was conducted at 40° C. for 3 days. Polymer was obtained in a yield of 34%. The polymer had a reduced viscosity of $\eta_{sp./c.}$=0.51 (c.=0.5 g./dl. in benzene). The decomposition point of the polymer was around 135° C.

Example VII 1.90 grams of $\Delta^4$-tetrahydrophthalic anhydride were dissolved in 8.44 grams of tetrahydrofuran and 4.00 grams of dioxane under nitrogen atmosphere. 0.09 gram of water, 0.40 gram of α-chlorodimethyl ether and 0.56 gram of triethylaluminum were then added. Polymerization was conducted at 30° C. for 5 days. Polymer was obtained in a yield of 26%. The polymer had a reduced viscosity of $\eta_{sp./c.}$=0.49 (c.=0.5 g./dl. in benzene). The decomposition point of the polymer was around 130° C.

Example VIII 1.96 grams of maleic anhydride were dissolved in 16.88 grams of tetrahydrofuran and 8.00 grams of dioxane under nitrogen atmosphere. 0.10 gram of water, 0.33 gram of propylene oxide and 0.65 gram of triethylaluminum were added. Polymerization was conducted at 30° C. for 1 day. Polymer was obtained in a yield of 29%. The polymer had a reduced viscosity of $\eta_{sp./c.}$=0.31 (c.=0.5 g./dl. in dichloroethane). Its decomposition point was around 170° C.

Example IX 1.08 grams of succinic anhydride were dissolved in 8.44 grams of tetrahydrofuran under nitrogen atmosphere. 0.72 gram of triethylaluminum, 0.11 gram of water and 0.50 gram of acetyl chloride were then added. Polymerization was conducted at 40° C. for 1 day. Polymer was obtained in a yield of 46%. The polymer had a reduced viscosity of $\eta_{sp./c.}$=0.26 (c.=0.5 in benzene at 30° C.).

Example X 3.70 grams of phthalic anhydride were dissolved in 16.88 grams of tetrahydrofuran under nitrogen atmosphere. 0.23 gram of water, 0.75 gram of propylene oxide and 1.48 grams of triethylaluminum were then added. Polymerization was conducted at 30° C. for 5 days. Polymer was obtained in a yield of 82%. The polymer had a reduced viscosity of $\eta_{sp./c.}$=0.75 (c.=0.5 g./dl. in benzene at 30° C.). Its decomposition point was around 170° C.

We claim:
1. A process for producing a polyether ester copolymer of tetrahydrofuran and a cyclic acid anhydride selected from the group consisting of compounds of the following general formulas:

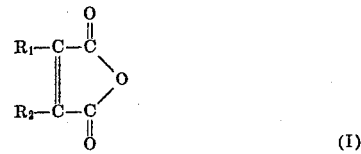
(I)

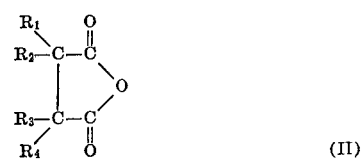
(II)

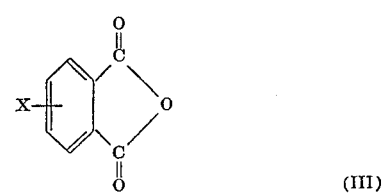
(III)

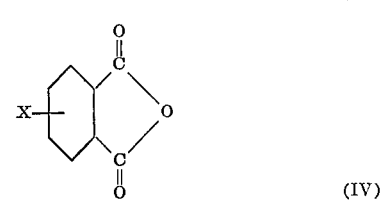
(IV)

wherein $R_1$, $R_2$, $R_3$ and $R_4$ are hydrogen or alkyl radicals, X is a radical selected from the group consisting of hydrogen, alkyl, and endomethylene, radicals, which comprises copolymerizing said tetrahydrofuran and said cyclic acid anhydride by means of a ternary catalyst system, of which the first component is an organometallic compound of the general formula $R_nM$, wherein M is a metal atom selected from the group consisting of lithium, zinc and aluminum, n is an integer from 1 to 3 inclusive, and R is selected from alkyl and aryl radicals and the second component is water and the third component is a compound selected from propylene oxide, epichlorohydrin, acetyl chloride, β-propiolactone and α-chlorodimethyl ether.

2. A process according to claim 1, in which said cyclic acid anhydride is a member selected from the group consisting of maleic anhydride, citraconic anhydride, succinic anhydride, phthalic anhydride, dihydrophthalic anhydride, tetrahydrophthalic anhydride, hexahydrophthalic anydride and endometylene tetrahydrophthalic anhydride.

3. A process according to claim 1, which comprises copolymerizing tetrahydrofuran and phthalic anhydride by means of said ternary catalyst system.

4. A process according to claim 1, which comprises copolymerizing tetrahydrofuran and endomethylene-tetrahydrophthalic anhydride by means of said ternary catalyst system.

5. A process according to claim 1, in which the first component of the catalyst system is triethylaluminum.

6. A process according to claim 1, in which the molar ratio of cyclic acid anyride to tetrahydrofuran is in the range of from 0.01 to 0.30.

7. A process according to claim 1, in which the catalyst system comprises $AlEt_3$-$H_2O$-epichlorohydrin in molar ratio from 1:0.5:0.5 to 1:3:3.

8. A process according to claim 1, in which the catalyst system comprises $AlEt_3$-$H_2O$-propylene oxide in the molar ratio from 1:0.5:0.5 to 1:3:3.

9. A process according to claim 1, in which the catalyst system comprises $AlEt_3$-$H_2O$-acetylchloride in the molar ratio from 1:0.5:0.5 to 1:3:3.

10. A process according to claim 1, in which the catalyst system is used in the amount of from 0.1 to 10 mol percent (calculated as metal concentration) based on the amount of total monomer.

11. A process according to claim 1, in which the reaction is carried out at a temperature between −78° C. to 200° C.

References Cited

UNITED STATES PATENTS

| | | | |
|---|---|---|---|
| 3,337,511 | 8/1967 | Matsuura et al. | 260—78.4 |
| 3,382,217 | 5/1968 | Case | 260—78.4 |
| 2,811,512 | 10/1957 | Austin et al. | 260—78.4 |
| 3,314,898 | 4/1967 | Furukawa et al. | 260—2 |

JOSEPH L. SCHOFER, Primary Examiner

C. A. HENDERSON, JR., Assistant Examiner

U.S. Cl. X.R.

252—431; 260—2